Feb. 10, 1931.  G. H. TREMOLIERES  1,791,984
DRIVING CHAIN
Filed June 22, 1928
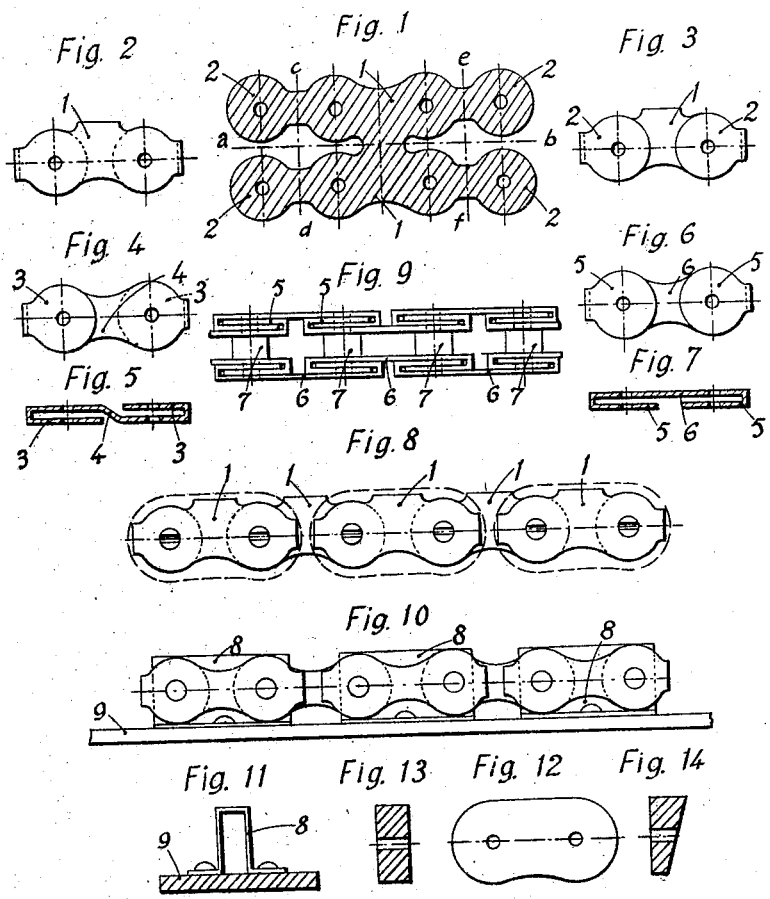

Patented Feb. 10, 1931

1,791,984

UNITED STATES PATENT OFFICE

GUSTAVE HENRI TREMOLIERES, OF NEUILLY-SUR-SEINE, FRANCE

DRIVING CHAIN

Application filed June 22, 1928, Serial No. 287,559, and in France June 29, 1927.

The present invention relates to chains of various sections which are employed for driving purposes, for large or small power. Its object is to produce metallic links upon which may be disposed suitable covering links of leather or like material. The disposition of said links upon one another is such that the efforts of traction are supported not only by the pivot axles and their bearings in the links, but also by a portion of the periphery of the links themselves. Due to this construction, the links are attached together, as will be further specified.

The following description, with reference to the appended drawings, relates to various forms of chain according to the invention.

Fig. 1 is a plan view of a piece of sheet steel or other metal which is shaped so as to produce the internal or external links according to the invention. Fig. 2 is a front view of the external link thus formed, and Fig. 3 is a like view relating to an internal link. Fig. 4 is a front view of another type of link according to the invention, and Fig. 5 is a section of the same. Fig. 6 is a front view of another form of link according to the invention, and Fig. 7 is a section of the same. Fig. 8 is an elevational view of an assembled chain with the elements or links shown in Figs. 2 and 3. Fig. 9 is a plan view of a chain consisting of the elements shown in Figs. 6 and 7, provided with axles. Fig. 10 shows a construction in which links of the form represented in Figs. 6, 7 are mounted on a flat belt, this type being used for small power. Fig. 11 shows the metallic element secured to the belt, and upon which the links are mounted. Fig. 12 is a front view of the covering links shown in dotted lines in Fig. 8, and such links consisting of leather or the like may have a section which is rectangular (Fig. 13), trapezoidal (Fig. 14) or even half-round.

Referring to the figures, I will first describe the method of manufacture of the links, which is practically the same for all the types. The parts of the chain shown in Fig. 8 are the ones which will be described in detail with reference to Figs. 1, 2 and 3.

In a piece of sheet steel, or like sheet metal, is cut out the piece whose shape is indicated in Fig. 1; in symmetrical disposition relatively to the axis $a$—$b$ are disposed the pieces which, after bending as will be described, serve to produce the links according to the invention.

In the chain shown by way off example, two types of links are necessary, whereof one will be termed the internal link and the other the external link, the first being shown in Fig. 3 and the second in Fig. 2.

To form the internal link, Fig. 3, I first bend the two symmetrical parts on the axis $a$—$b$, optionally leaving a space between the pieces, and then bend the parts 2—2 upon the parts 1—1 on the axes $c$—$d$ and $e$—$f$, towards the exterior, in such manner that the holes coincide, a space being left between the bent pieces.

To form the external link, Fig. 2, I first bend the parts 1—2 upon the parts 1, on the axes $c$—$d$ and $e$—$f$, leaving a space between the said pieces, and then bend the parts 1—1 upon one another on the axis $a$—$b$, leaving a space between these parts.

The said space should obviously have a value corresponding to the thickness of the sheet metal in use, and in this event, to form the chain I attach an internal link to two external links, and so on; the parts 2—2 are mutually superposed and the holes coincide, and the device is completed by inserting pivot axles through the said holes. It will be noted that the parts 2 which are attached together will mutually support one another, and that the tractive stresses are transmitted not only by the axles but also by the parts 2.

As may be desired, the chain can be completed by the use of covering links, Fig. 12, whose cross section may vary according to the case; such links are shown in the dotted lines in Fig. 8. It should be remarked that the device need not be entirely folded down to form parallel planes, but the folding can be effected, for the symmetrical parts 1—2—2, at a certain angle.

The other two types of link, Figs. 4—5 or 6—7, are more simply manufactured, and in the plan view, one link has the form of an S and the other the form of a C. To produce the chain, the single parts are attached together, as shown in the preceding case.

For instance for the chain represented in Figs. 4—5, the parts 3—3 are mutually attached together; for the links in Figs. 6—7, the parts 5—5 are folded upon the part 6, these parts being mutually attached together, according to the same principle.

Fig. 9 shows a double chain comprising the axles 7, it being optionally provided with rollers consisting of the parts shown in Figs. 6—7, these being attached at either side of the axles 7.

Fig. 10 relates to a chain adapted for very small forces; it consists of the same links as above mentioned, but these are disposed at the respective sides of a piece 8 (Fig. 11) which is riveted to a belt 9.

From the preceding, it is readily observed that in all cases the chains according to the invention have, as characteristic features, the attaching or coupling of certain bent parts which form the link, which parts are additionally connected together by pivot axles, and the external parts are covered, according to the case, by covering links whose cross section may be varied as desired according to the use of the chains. The chains may even be mounted upon central pieces making a certain angle, and for the larger chains, such pieces may consist of cast metal.

Claims:

1. An endless driving member of the character described including a plurality of interconnected links arranged in pairs, each pair being formed from a single blank having a portion integrally connecting the same together transversely and having end extensions reversely folded upon themselves for interengagement with the corresponding extensions of the adjacent pair of links, and means for connecting adjacent pairs of links together.

2. A mechanical chain composed of metallic links, each of which consists of one blank embodying two laterally connected main portions each of which are provided with parallel and lateral end extensions which are reversely folded upon themselves, the lateral extensions of one link being folded inwardly and the lateral extensions of the adjacent link being folded outwardly so that the adjacent extensions can be interengaged with each other, and coupling pins between the interengaged extensions of the adjacent links.

3. A mechanical chain composed of metallic links, each of which consists of two blanks, each blank corresponding to one-half of the link and being provided with lateral end extensions, the end extensions of one blank being folded inwardly and the end extensions of the other blank being folded outwardly, the blanks of each link being symmetrically disposed with respect to each other while the blanks of one link are coupled with the corresponding blanks of the adjacent link, and means for uniting said coupled corresponding blanks.

4. The combination of metallic links for the transmission of power as claimed in claim 1, of adhering elements connected on the outer sides of the links so that the mechanical chains composed of these links will operate as a belt.

In testimony whereof I affix my signature.
GUSTAVE HENRI TREMOLIERES.